(12) United States Patent
Gehrling et al.

(10) Patent No.: US 11,861,407 B2
(45) Date of Patent: Jan. 2, 2024

(54) METHOD FOR MANAGING COMPUTING CAPACITIES IN A NETWORK WITH MOBILE PARTICIPANTS

(71) Applicant: Volkswagen Aktiengesellschaft, Wolfsburg (DE)

(72) Inventors: Sebastian Gehrling, Essen (DE); Steffen Schmitz, Wesel (DE); Jens Kampermann, Haan (DE); Karthik Satyanarayana, Bochum (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 290 days.

(21) Appl. No.: 17/415,670

(22) PCT Filed: Dec. 12, 2019

(86) PCT No.: PCT/EP2019/084915
§ 371 (c)(1),
(2) Date: Jun. 17, 2021

(87) PCT Pub. No.: WO2020/126827
PCT Pub. Date: Jun. 25, 2020

(65) Prior Publication Data
US 2022/0050725 A1 Feb. 17, 2022

(30) Foreign Application Priority Data
Dec. 20, 2018 (DE) .......................... 102018009906.8

(51) Int. Cl.
*G06F 9/46* (2006.01)
*G06F 9/50* (2006.01)

(52) U.S. Cl.
CPC ...... *G06F 9/5038* (2013.01); *G06F 2209/509* (2013.01)

(58) Field of Classification Search
CPC .......................... G06F 9/5038; G06F 2209/509
See application file for complete search history.

(56) References Cited

U.S. PATENT DOCUMENTS 8,725,800 B1 * 5/2014 Chan ....................... H04L 67/04
455/414.1
2012/0297016 A1 11/2012 Iyer et al.
(Continued)

FOREIGN PATENT DOCUMENTS

DE   102007063011 A1   6/2009
DE   102013001747 A1   7/2014
(Continued)

OTHER PUBLICATIONS

Ashok et al, Vehicular Cloud Computing through Dynamic Computation Offloading, Elsevier, Dec. 2017, pp. 125-137. (Year: 2017).*
(Continued)

*Primary Examiner* — Diem K Cao
(74) *Attorney, Agent, or Firm* — Peter Zura; LOZA & LOZA, LLP

(57) ABSTRACT

Technologies and techniques for a mobile end device to offload computing from the mobile end device to at least one edge computer and/or at least one cloud computer. Resource information may be obtained from the at least one edge computer and/or at least one cloud computer. Application information may be obtained from at least one system application in the mobile end device, and A computing capacity may be assigned for the at least one system application in the mobile end device to the at least one edge computer and/or the at least one cloud computer.

17 Claims, 2 Drawing Sheets

(56) References Cited

U.S. PATENT DOCUMENTS

| | | | | |
|---|---|---|---|---|
| 2014/0095695 | A1* | 4/2014 | Wang | G06F 9/5088 709/224 |
| 2018/0150085 | A1* | 5/2018 | Dey | H04L 67/10 |
| 2019/0047581 | A1* | 2/2019 | Bai | G06F 9/5027 |
| 2019/0208007 | A1* | 7/2019 | Khalid | H04L 67/1021 |
| 2021/0099848 | A1* | 4/2021 | Ruan | H04W 36/0079 |
| 2021/0136142 | A1* | 5/2021 | Dong | G06F 9/5094 |

FOREIGN PATENT DOCUMENTS

| | | | |
|---|---|---|---|
| KR | 20140026503 | A | 3/2014 |
| KR | 20180098798 | A | 9/2018 |
| KR | 20180119905 | A | 11/2018 |

OTHER PUBLICATIONS

PCT/EP19/084915. International Search Report. (dated Mar. 10, 2020).

Zhou et al. "A Context Sensitive Offloading Scheme for Mobile Cloud Computing Service." 2015 IEEE 8th International Conference on Cloud Computing, pp. 869-876 (2015).

Mach et al. "Mobile Edge Computing: A Survey on Architecture and Computation Offloading." EEE Communications Surveys & Tutorials, vol. 19, No. 3, pp. 1628-1656 (2017).

Rahimi et al. "MuSIC: Mobility-Aware Optimal Service Allocation in Mobile Cloud Computing." 2013 IEEE Sixth International Conference on Cloud Computing, pp. 75-82 (2013).

Altintas et al. "Making cars a main ICT resource in smart cities." 2015 IEEE Conference on Computer Communications Workshops (INFOCOM WKSHPS) pp. 582-587 (2015).

* cited by examiner

METHOD FOR MANAGING COMPUTING CAPACITIES IN A NETWORK WITH MOBILE PARTICIPANTS

CROSS REFERENCE TO RELATED APPLICATION

The present application claims priority to International Patent Application No. PCT/EP2019/084915 to Sebastian Gehrling et al., filed Dec. 12, 2019, titled "Method for Managing Computer Capacities in a Network Having Mobile Subscribers", which claims priority to German Patent Application no. 10 2018 009 906.8, to Sebastian Gehrling et al., filed Dec. 20, 2018, the contents of each being incorporated by reference in their entirety herein.

TECHNICAL FIELD

The present disclosure relates to methods and control units for a mobile end device (e.g. a vehicle) for offloading computational tasks from mobile end device to at least one edge cloud computer and/or at least one cloud computer via a network, a mobile end device (e.g. a vehicle), and a network, preferably a vehicle network, which has numerous networked mobile end devices, e.g. vehicles.

BACKGROUND

Due to the computing power necessary for automated vehicles, in particular highly automated vehicles, and preferably self-driving vehicles, it makes sense to decentralize the execution of certain applications or computing operations (e.g., by means of edge/cloud computing). This makes particular sense with networked vehicles. If there are numerous computers, an appropriate assignment of computing tasks to computing resources is advisable.

In addition to the local computers, decentralized cloud computing capacities are currently available for offloading computational tasks from these local computers to the cloud computer. Cloud-based computer architectures reach their limits in applications with time restrictions, however, due to the latencies associated therewith.

Edge computing distributes the cloud use to the edge of the network in order to shorten the signal paths and response times when offloading computing from the local computers to the edge computers. Edge computing for mobile applications, e.g., in vehicles, has not yet been taken into account due to dynamic characteristics within vehicles and the mobility of the vehicles.

SUMMARY

In various examples, technologies and techniques are disclosed, for improving computation offloading from the mobile end device, in particular from the vehicle, to at least one edge computer and/or at least one cloud computer. Various methods and control units may be configured for computation offloading from the mobile end device, in particular from the vehicle, to at least one edge computer and/or at least one cloud computer, enabling a dynamic, quick and efficient provision of decentralized computing power in real-time to mobile end devices, in particular vehicles. In some examples, an improved mobile end device, in particular a vehicle are disclosed, with which the computation can be offloaded dynamically, in real-time, quickly and efficiently. In some examples, an improved network, preferably a vehicle network, is disclosed containing numerous networked mobile end devices, e.g. vehicles, which ensures an efficient utilization of computing capacity among the networked vehicles and an improved execution of possible system applications in the networked mobile end devices, such as vehicles.

Improved methods for a mobile end device, in particular a vehicle, are also disclosed for computation offloading from the mobile end device, in particular the vehicle, to at least one edge computer and/or at least one cloud computer, which has the features of the independent method claim, an improved control unit for a mobile end device, in particular a vehicle, for computation offloading from the mobile end device, in particular from the vehicle, to at least one edge computer and/or at least one cloud computer, an improved mobile end device, in particular a vehicle, and a network, preferably a vehicle network containing numerous networked mobile end devices, e.g. vehicles. Features disclosed with regard to individual aspects of the invention can be combined with one another such that reference is or can be made to the aspects of the invention in this regard.

Some examples disclose a mobile end device, such as a vehicle, that has a control unit that can be designed as described herein. The same advantages that are described above in conjunction with the method according to the present disclosure and/or the control unit according to the present disclosure may be obtained with the mobile end device, particularly the vehicle. Reference is made to these advantages in their entirety.

Some examples disclose a network, such as a vehicle network, which has numerous networked mobile end devices, e.g., vehicles, wherein at least one mobile end device, e.g., a vehicle, of the numerous networked mobile end devices, can be a mobile end device such as that described herein. The same advantages that are described herein in conjunction with the methods and/or the control unit according to the present disclosure and/or the end device according to the present disclosure, in particular a vehicle, are obtained with the network (e.g., a vehicle network). Reference is made to these advantages in their entirety. Furthermore, an improved network is created with the network according to the present disclosure, such as a vehicle network, in which optimal use is made of the computing resources. It is conceivable that a vehicle in the form of a mobile end device as set forth in the present disclosure has already evaluated certain street signs. Subsequent vehicles then do not need to carry out this evaluation, if the results of the evaluation are distributed to the other networked vehicles.

With a network, in particular a vehicle network, the technologies and techniques disclosed herein can provide that at least one computing capacity for at least one system application can be divided among the mobile end devices, in particular vehicles, wherein the computing capacity in one of the numerous networked mobile end devices, e.g., vehicles, can be provided by at least one edge computer or at least one cloud computer. In this manner, the computing resources within the network, in particular the vehicle network, can be utilized advantageously, e.g., through sensor data fusion.

BRIEF DESCRIPTION OF THE DRAWINGS

Other measures that improve the present disclosure shall be explained in greater detail below in the description of preferred exemplary embodiments of the invention in reference to the figures. The features specified in the claims and in the description can each be substantial to the invention.

DETAILED DESCRIPTION

Figure 1:
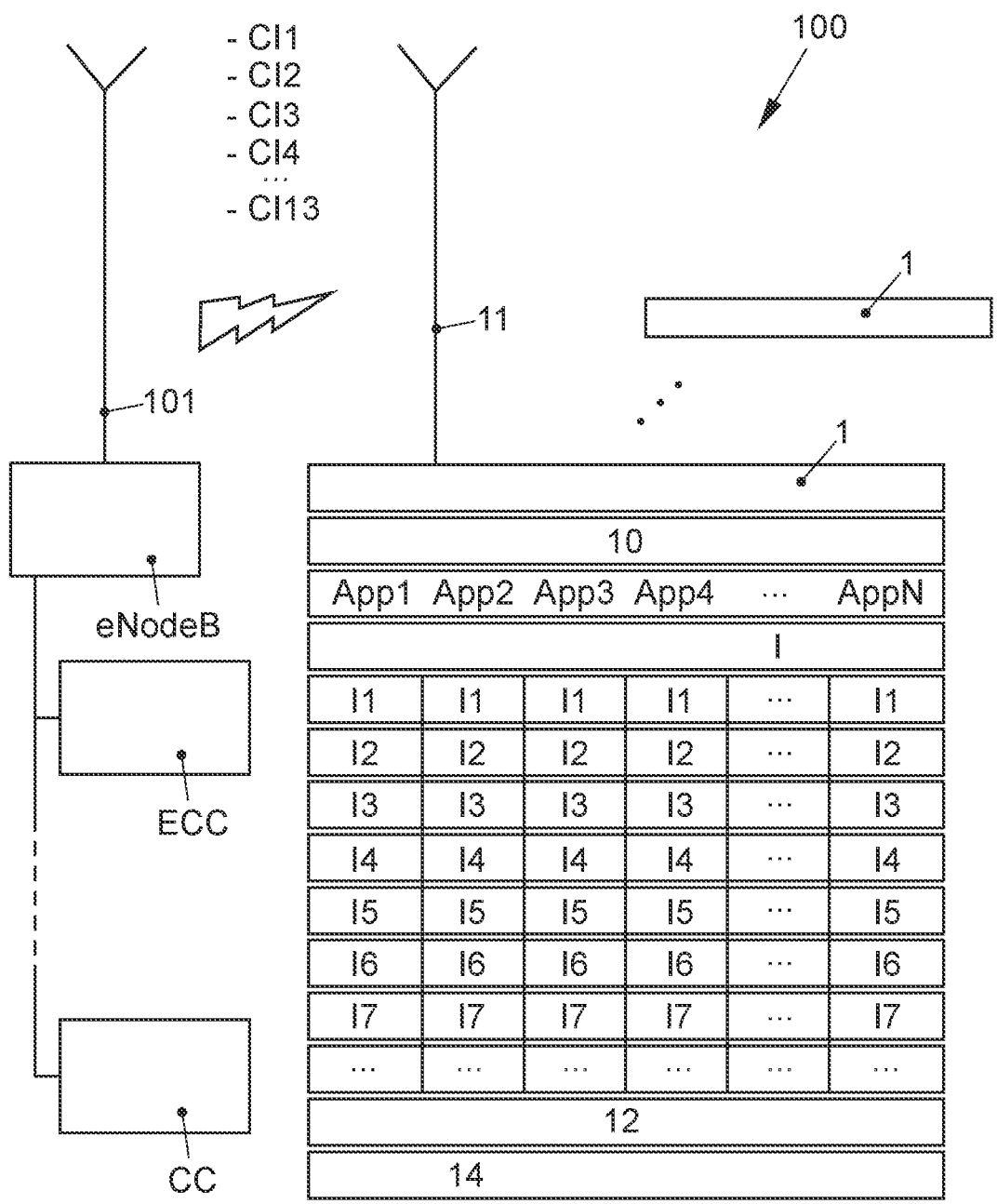
FIG. 1 shows a schematic illustration of a network for executing a method according to the invention.

The same technical features in the various figures are indicated by the same reference symbols, wherein a technical feature is normally described only once.

In some examples, a mobile end device, such as a vehicle, may be configured for computation offloading from the mobile end devices (e.g., from the vehicles), to at least one edge computer and/or at least one cloud computer, comprising the following steps: 1) obtaining resource information from the at least one edge computer (e.g. available resources, latencies, availabilities, power consumption, connection quality, costs, etc., 2) obtaining resource information from the at least one cloud computer (e.g. available resources, latencies, availabilities, power consumption, connection quality, costs, etc.), 3) obtaining application information from at least one system application in the mobile end device, such as the vehicle (resource demand, location, application information, latency requirements, data quantities, data types (private, local, global, etc.), and 4) assigning a computing capacity for the at least one system application in the mobile end device, such as the vehicle, to the at least one edge computer and/or the at least one cloud computer, preferably on the basis of the resource information and application information that has been obtained.

In some examples, an edge computer as may be configured as a computing node in an edge node network, which has a processor with computing power and a communication unit for exchanging data with other edge computers and/or an end devices. An edge computer can provide computing power at the edge of the edge node network. The edge computer can receive data from the end device according to the invention, e.g., a vehicle, via the communication unit, which it can then process with its own computing power on its processor. The results of this processing can be sent back to the vehicle by the edge computer via the communication unit. The data can comprise sensor data, for example, which can be evaluated on the edge computer. It is also conceivable for the edge computer to assume different computing tasks for different system applications in the mobile end device, e.g., in the vehicle.

The mobile end device, or some of the systems in the mobile end device, can send data to at least one edge computer and/or at least one cloud computer, which may be processed with external computing, if, for example, there is no computing power available for this in the mobile end device, or the computing power is insufficient, or is being used elsewhere. Of the potentially numerous edge and cloud computers, at least one near edge computer and/or at least one remote cloud computer may be selected, which is best suited to executing a desired system application in the mobile end device.

In some examples, an edge computer as set forth in the present disclosure can be understood to be a stationary edge computer as well as a mobile edge computer. A stationary edge computer may be configured as a base station for a mobile service provider and/or a network provider. A mobile edge computer may be installed at different locations where computing power is needed in mobile end devices, in particular vehicles, e.g., at intersections, parking lots, etc. It is also conceivable for a mobile edge computer as set forth herein to be in motion while it provides the computing power. By way of example, a vehicle, e.g., a vehicle belonging to a fleet of vehicles, a drone, or a mobile base station can be used as a mobile edge computer.

It is conceivable within the framework of the present disclosure that the computing power that is offloaded from the mobile end device for a system application, is entirely offloaded or only partially offloaded.

Decentralized computing capacities as disclosed herein may be advantageous as resources for system applications and/or computing operations of system applications in mobile end devices, in particular vehicles. In some examples, edge computers can be located in close proximity, or within a specific distance (e.g. 100 to 500 meters) to a mobile end device, such as a vehicle (e.g. at intersections or on other vehicles). Cloud computers can be located in remote computing centers. As a result, it may be necessary to address the decentralized resources, (e.g., the edge computer and/or cloud computer) in accordance with the requirements for this. Specific system applications or computing operations for a specific system application may be assigned to an edge computer or a cloud computer based on existing, decision-relevant resource information and application information, as well as properties of transmission paths.

Advantageously, decision-relevant variables in the external resources (e.g., data transfer rate, latency, power consumption, costs, etc.) may be taken into account within the framework of the present disclosure, both from the perspective of the system applications that are to be executed, and from the perspective of the network, such as the available edge computers and/or cloud computers in the network.

Each system application in the mobile end device, in particular in the vehicle, can in turn be assigned different application information that describes the various requirements or properties of the respective system application, e.g., priority, resource requirements, acceptable waiting times, file size, data type, power requirements and/or costs.

The evaluation of all of the information and the assignment of optimal computing capacities based on the given requirements may be carried out by a control unit in a mobile end device, e.g., a vehicle, which functions as a type of orchestrator for all of the possible system applications for computation offloading from the mobile end device, in particular a vehicle, to at least one near edge computer and/or at least one remote cloud computer, of the potentially numerous edge and cloud computers. In the case of a vehicle serving as a mobile end device as set forth in the present disclosure, the control unit can be part of the central control unit for the vehicle, or it can be a separate control unit, designed to monitor the network (edge computer and/or cloud computer) within the reception range of the vehicle; monitor the system applications within the vehicle; manage the computing power within the vehicle, and offload computing power from the vehicle to at least one near edge computer and/or at least one remote cloud computer (of the potentially numerous edge and cloud computers).

With mobile end devices, such as vehicles that are in motion, the availability of edge computers and/or cloud computers may change. The present disclosure advantageously makes it possible to dynamically take available edge computers and/or cloud computers and their resource information into account. If the application information is known for system applications in the mobile end device, in particular in a vehicle, computational offloading may be configured to be dynamic (e.g., temporally and/or locally variable, and/or variable with regard to data management and/or data transfer rates) from the perspective of the mobile end device (e.g., vehicle). The requirements for time-critical system applications in the mobile end device, e.g. a vehicle, may also be taken into account for the applications in an optimal manner.

In some examples, computation offloading from the mobile end device (e.g., vehicle) to at least one edge computer and/or at least one cloud computer, may be configured such that the resource information from the at least one edge computer or the at least one cloud computer includes at least one of the following:
 position, e.g. geographic location,
 properties of the connection, e.g. connection quality,
 services offered,
 data transfer rate,
 computing power and/or memory (volatile, non-volatile), workload,
 reception range (seen geographically, in relation to people, in relation to the computer, in relation to content, etc.),
 temporal availability,
 available computing capacity,
 reliability,
 response time,
 power consumption,
 costs.

As a result, both current and changing aspects can be taken into account that are specific to the available edge computer and/or cloud computer. These aspects may also be relevant to decisions regarding the suitability of the edge computer and/or cloud computer for providing computing power for specific system applications in the mobile end device, in particular a vehicle.

In some examples, computation offloading from the mobile end device to at least one edge computer and/or at least one cloud computer may be configured such that the application information from at least one system application in the mobile end device includes at least one of the following:
 priority,
 resource requirements,
 acceptable response time,
 file size,
 data type,
 power requirements,
 costs.

The priority makes it possible to check how important the respective system application is for the mobile end device at the moment, or will be while the mobile end device is in motion, e.g., while the vehicle is travelling. Advantageously, safety-relevant system applications can be assigned a higher priority than entertainment functions. "Resource requirements" are those resources needed for executing the respective system application. "Acceptable response time" refers to the maximum (reasonable) latency for the system application. "File size" indicates the size of the data file that is to be sent. "Data type" refers more precisely to the data that are to be sent. Possible properties can include data confidentiality. If private data are transferred, the data are from local users. If global data are transferred, these data can come from superordinate users, e.g., for other mobile end devices, e.g., vehicles. "Power consumption" relates to information regarding the energy needed to execute the system application. "Costs" relate to information regarding the costs involved in the use of the respective computing capacity. All of this application information may be stored in a control unit under some examples. The control unit can also allow the possibilities externally available to the mobile end device to execute one or more system applications in a decentralized manner, and send the data for the system application back to the mobile end device. The control unit may also know the relevant resource information for the network. Based on the requirements for the system application, as well as the knowledge regarding relevant resource information for the network, the control unit makes a decision regarding where the system application in question can be executed. This can then take place either locally, in the mobile edge computer, and/or in an external computing center, such as a cloud computer.

In some examples, computation offloading from the mobile end device to at least one edge computer and/or at least one cloud computer may be configured for at least one of the following system applications:
 navigation,
 position determination,
 streaming,
 data processing,
 gesture recognition,
 sensor data evaluation,
 sensor data fusion,
 driving maneuver calculation,
 driver assistance functions,
 driving modes in accordance with one of the numerous possible degrees of automation when operating the vehicle, if the mobile end device is a vehicle,
 highly automated and/or autonomous driving, if the mobile end device is a vehicle.

In such configurations, performance within the mobile end device, in particular in the form of a vehicle, can advantageously be improved and expanded. Customer convenience can be also increased in this manner.

In a method for offloading from the mobile end device to at least one edge computer and/or at least one cloud computer, the steps 1) to 4) described above may be repeated dynamically, based on the speed, and/or route, and/or desired system applications in the mobile end device. This enables a dynamic offloading of the system applications while the mobile end device is in motion, if there is a change in the system applications that are needed, and if there is a change in networks in the (geographic) reception range of the mobile end device.

Furthermore, when utilizing computation offloading from the mobile end device to at least one edge computer and/or at least one cloud computer, the present disclosure can also provide that the at least one edge computer, in the form of a stationary and/or mobile edge node for a network, may be configured as a base station for a mobile service provider, and/or a network provider, a mobile telephone, smartphone, tablet, vehicle, drone, or some other wireless connection end device. This results in a flexible network with extended functions and better coverage and connectivity.

In some examples, a control unit is disclosed for a mobile end device, in particular a vehicle, for computation offloading from the mobile end device, in particular from the motor vehicle, to at least one edge computer and/or at least one cloud computer, that may include a communication unit for acquiring resource information from the at least one edge computer and/or resource information from the at least one cloud computer, wherein the communication unit is designed to obtain application information from at least one system application in the mobile end device, in particular a vehicle, and a computer for assigning a computing capacity for the at least one system application in the mobile end device, in particular in the vehicle, to at least one edge computer and/or at least one cloud computer, preferably based on the acquired resource information and application information.

Advantageously, the control unit can be configured to execute a method that can run as described herein.

According to another example, the control unit can be part of a central control unit for the mobile end device, in particular the vehicle, or it can be a separate control unit. A central control unit can be incorporated in modern mobile end units, in particular vehicles, by the manufacturer. With a separate control unit, the functions of existing mobile end devices, e.g. vehicles, can be expanded.

Furthermore, with a control unit for a mobile end device, e.g., a vehicle, configured to offload computing power from the mobile end device to at least one edge computer and/or at least one cloud computer, the present disclosure can provide a memory in which a dynamic list is stored that includes at least one edge computer and/or at least one cloud computer within the reception range of the mobile end device. This list can indicate the available external edge computers and/or cloud computers that are currently and/or will be within the reception range of, and/or along the route taken by, the mobile end device, in particular the vehicle. As a result, a better selection of edge computers and/or cloud computers that are being passed can be obtained, which can reliably provide the computing power while the mobile end device is in motion. The list can also be used to determine the areas where there is poor coverage by the edge computer and/or cloud computer, in order to avoid these regions as desired.

Furthermore, with a control unit for a mobile end device for computation offloading from the mobile end device to at least one edge computer and/or at least one cloud computer, the present disclosure can provide that the computer is configured to dynamically update the mobile end device based on the speed and/or route and/or desired or required system applications, e.g. for a degree of driving automation. It is possible to determine which edge computers and/or cloud computers are currently available in this manner.

FIG. 1 illustrates a method according to the present disclosure for a mobile end device 1, e.g. a vehicle, for offloading computing power CI5 from the mobile end device 1, e.g. from the vehicle, to at least one near edge computer ECC and/or at least one remote cloud computer CC (of potentially numerous edge and cloud computers), that may include the following steps:
1) obtaining resource information CI from the at least one edge computer ECC,
2) obtaining resource information CI from the at least one cloud computer CC,
3) obtaining application information I from at least one system application APP in the mobile end device 1, e.g. a vehicle,
4) assigning a computing capacity for the at least one system application APP in the mobile end device 1, e.g. in a vehicle, to at least one edge computer ECC and/or at least one cloud computer CC.

An edge computer ECC can be located at the edge of a network and have a processor that has a computing power CI5 and a communication unit 101 for exchanging data, for example, with the mobile end device 1 according to the invention, e.g., the vehicle. The edge computer ECC can provide computing power CI5 at the edge of the edge node network. The edge computer ECC can receive data from the mobile end device 1, e.g., a vehicle, via the communication unit 101, which it can process with its own computing power CI5 on its processor. The results of the processing can be sent back to the mobile end device 1, e.g., a vehicle, from the edge computer ECC via the communication unit 101. These data can be sensor data, which can be evaluated on the edge computer ECC. It is also conceivable that the edge computer ECC can assume various computing tasks for different system applications APP in the mobile end device 1, e.g., a vehicle.

The mobile end device 1, e.g., a vehicle, or some systems within the mobile end device 1, e.g., the vehicle, can send data to at least one edge computer ECC and/or at least one cloud computer CC within the framework of the invention, which are to be processed externally there, e.g., if the computing power CI5 in the mobile end device 1 is not available, not sufficient, or otherwise used. According to some examples, at least one edge computer ECC and/or at least one cloud computer CC (of potentially numerous edge and cloud computers) can be selected that is capable of executing a desired system application APP in the mobile end device 1.

An edge computer ECC can be a stationary edge computer ECC, e.g., in the form of a base station for a mobile service provider and/or network provider, or it can be a mobile edge computer ECC. A mobile edge computer ECC as set forth in the present disclosure can be placed at different locations where computing power CI5 is needed in mobile end devices 1, e.g., vehicles, for example, at intersections, parking lots, etc. The mobile edge computer ECC as set forth in the present disclosure can also be in motion while it is providing the computing power CI5. A vehicle 1, e.g., a vehicle from a fleet, a drone, or a mobile base station can be used as a mobile edge computer ECC as set forth in the present disclosure.

In some examples, decentralized computing capacities may be used as resources for system applications APP in mobile end devices, e.g., a vehicle. The edge computers ECC can be near (e.g., 100 to 500 meters) the mobile end device 1, e.g. a vehicle (e.g. at intersections or in other vehicles). The cloud computers CC can be in remote computer centers. The edge computer ECC and/or cloud computer CC may be addressed in accordance with system requirements.

The following decision-relevant resource information CI from the external resources may be taken into account from the perspective of the available edge computer ECC and/or cloud computer CC for this:
- position, e.g. geographical location CI1,
- properties of the connection, e.g. connection quality CI2,
- services CI3 offered,
- data transfer rate CI4,
- computing power and/or memory (volatile/non-volatile) CI5,
- workload CI6,
- reception range (seen geographically, in relation to people, in relation to the computer, in relation to content, etc.) CI7,
- temporal availability CI8,
- available computing capacity CI9,
- reliability CI10,
- response time CI11,
- power consumption CI12,
- costs CI13.

Each system application APP in the mobile end device 1, e.g. a vehicle, can in turn be assigned different application information I, which describe different requirements or properties of the respective system application APP, e.g.:

priority I1,
resource requirements I2,
acceptable response time I3,
file size I4,
data type I5,
power requirements I6,
costs I7.

The evaluation of all of the resource information CI and application information I and the assignment of an optimal computing power CI5 on the mobile end device, e.g., the vehicle 1, and/or on the at least one edge computer ECC and/or at least one cloud computer CC take place on a control unit 10. The assignment takes place on the basis of the given requirements for the system application PP and the given resource information CI for the network. The control unit 10 functions as an orchestrator for all of the possible system applications APP for offloading computing CI5 from the mobile end device 1, e.g., the vehicle 1, to at least one near edge computer ECC and/or at least one remote cloud computer CC (of potentially numerous edge and cloud computers). The orchestrator decides whether and to where an application is offloaded.

The control unit 10 can be in the central control unit 10 for the mobile end device 1, e.g. the vehicle, or it can be a separate control unit 10, designed to
  monitor the network (edge computer ECC and/or cloud computer CC) within the reception range of the mobile end device 1, e.g. the vehicle, (i.e. within the range of the respective communication units 11, 101 of the communication partner),
  monitor the system applications APP within the mobile end device 1, e.g., the vehicle,
  manage the computing power CI5 within the mobile end device 1, e.g., the vehicle, and
  offload computing power CI5 from the mobile end device 1, e.g., the vehicle, to at least one near edge computer ECC and/or at least one remote cloud computer CC (of potentially numerous edge and cloud computers).

Because there is a change in available edge computers ECC and/or cloud computers CC with mobile end devices 1, e.g. vehicles, that are in motion, the present disclosure advantageously enables the available computing sources to be taken into account dynamically. If the application information I for system applications APP in the mobile end device 1, e.g., the vehicle, is known, the method according to the present disclosure enables a dynamic offloading of computing power CI5 from the mobile end device 1, e.g. the vehicle, even for time-critical system applications APP.

In some examples, system applications APP can be configured as one or more of the following applications:
  navigation,
  position determination,
  streaming,
  data processing,
  gesture recognition,
  sensor data evaluation,
  sensor data fusion,
  driving maneuver calculation,
  driver assistance functions,
  driving modes in accordance with one of the numerous possible degrees of automation when operating the vehicle 1,
  highly automated and/or autonomous driving.

Figure 2:
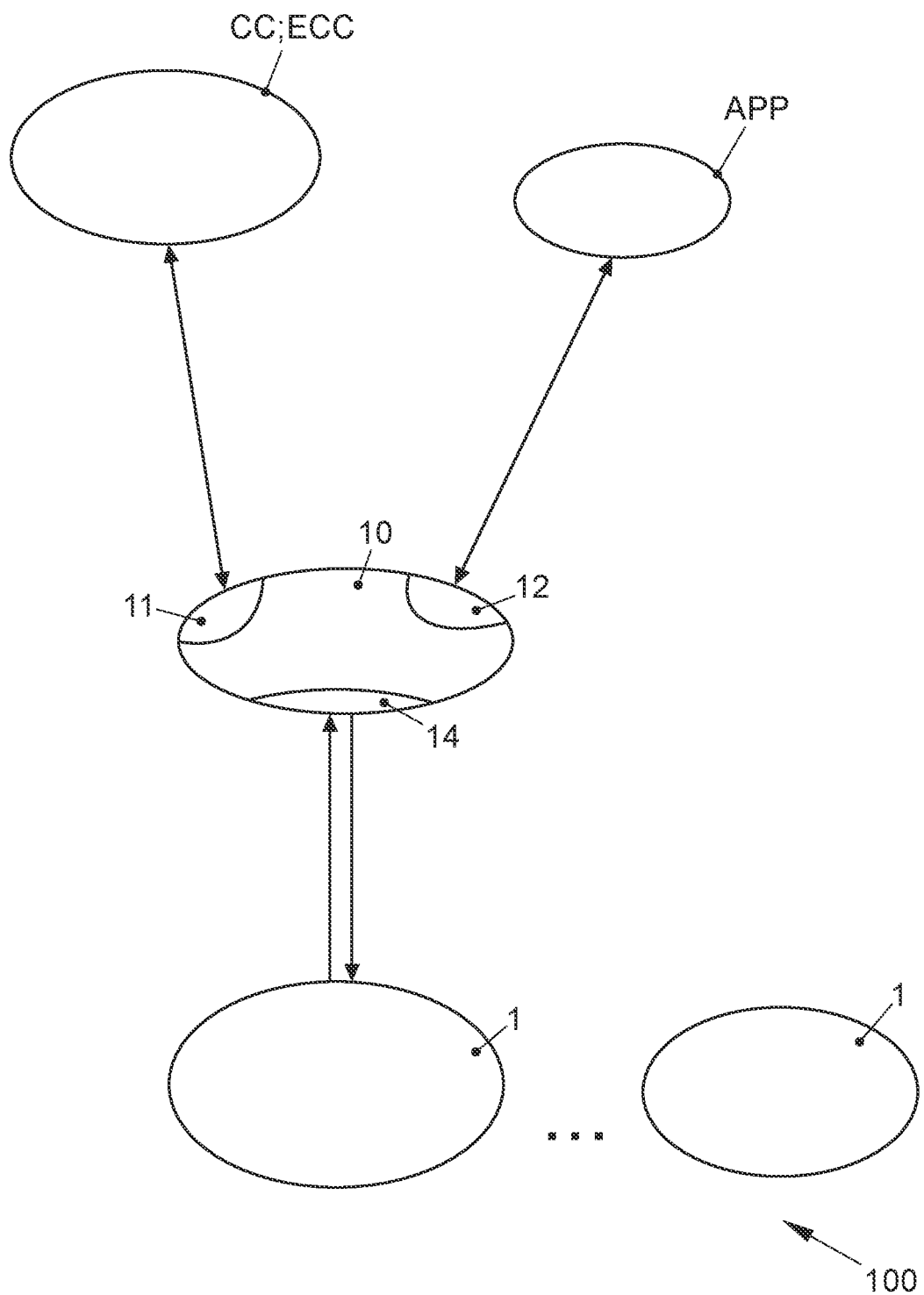
FIG. 2 shows a schematic illustration of a control unit according to the invention.

The control unit 10 according to the invention is shown by way of example in FIG. 2. The control unit 10 contains a communication unit 11 for obtaining resource information CI from the at least one edge computer ECC and/or resource information CI from the at least one cloud computer CC. The communication unit 11 is designed to obtain application information I from at least one system application APP in the mobile end device 1. The control unit 10 also contains a computer 12 for processing information and assigning computing capacity for the at least one system application APP in the mobile end device 1, e.g., the vehicle 1, to the at least one edge computer ECC and/or the at least one cloud computer.

The control unit 10 can also include a memory 14 in which a dynamic list is stored that contains at least one edge computer ECC and/or at least one cloud computer CC within the reception range of the mobile end device 1, e.g. the vehicle. The reception range for the mobile end device 1 can be determined by the data communication range between the communication unit 11 in the mobile end device 1 and the respective communication unit 101 in the network. It is also conceivable for the control unit 10 to use a suitable communication unit in the mobile end device 1 for communicating with the network.

A mobile end device 1, e.g. a vehicle, that has a control unit 10, likewise forms an aspect of the present disclosure.

A network 100, e.g. a vehicle network 100 that has numerous networked mobile end devices 1, e.g. vehicles, forms another aspect of the present disclosure, wherein at least of the numerous networked mobile end devices 1, can contain the control unit 10. An improved network can be obtained with the network 100, in particular a vehicle network 100, in which optimal use is made of the computing resources in the mobile end device 1, e.g. the vehicle, and the network. With a mobile end device 1 in the form of a vehicle, it is conceivable that a vehicle in the vehicle network 100 has already evaluated certain street signs. Subsequent vehicles then do not have to make this evaluation, if the results of the evaluation are distributed among the networked vehicles. Sensor data fusion and/or distribution between the vehicles for certain sensor data is also conceivable.

The above description of the figures describes the present invention exclusively in the framework of examples. Individual features of the embodiments can be freely combined with one another, if this is reasonable from a technological perspective, without abandoning the framework of the present disclosure.

LIST OF REFERENCE SYMBOLS 1 mobile end device
10 control unit
11 communication unit
12 computer
14 memory
100 network, vehicle network
101 communication unit
APP system application
CC cloud computer
CI resource information
CI1 position
CI2 connection quality
CI3 services offered
CI4 data transfer rate
CI5 computing power
CI6 workload
CI7 reception range
CI8 temporal availability
CI9 available computing capacity
CI10 reliability CI11 response time
CI12 power consumption
CI13 costs
ECC edge computer
I application information
I1 priority
I2 resource requirements
I3 acceptable response time
I4 file size
I5 data type
I6 power consumption
I7 costs

The invention claimed is:

1. A method for offloading computing from a mobile end device to at least one of an edge computer and/or a cloud computing device, comprising:
   (1) obtaining resource information from at least one of the edge computer;
   (2) obtaining resource information from the at least one cloud computing device;
   (3) obtaining application information from at least one system application in the mobile end device;
   (4) assigning a computing capacity for the at least one system application in the mobile end device to the at least one edge computer and/or the at least one cloud computer for offloaded computing; and
   dynamically repeating (1)-(4), depending on a speed and/or route of the mobile terminal device.

2. The method according to claim 1, wherein the resource information from the at least one edge computer and/or the at least one cloud computer comprises at least one of:
   a) geographic position,
   b) connection quality,
   c) services offered,
   d) data transfer rate,
   e) computing power and/or memory,
   f) workload,
   g) reception range,
   h) temporal availability,
   i) available computing capacity,
   j) reliability,
   k) response times,
   l) power consumption, and
   m) costs.

3. The method according to claim 1, wherein the application information for the at least one system application in the mobile end device comprises at least one of:
   a) resource requirements,
   b) acceptable response time,
   c) file size,
   d) data type,
   e) power requirements, and
   f) costs.

4. The method according to claim 1, wherein the system application for offloaded computing comprises one of:
   a) navigation,
   b) streaming,
   c) data processing,
   d) gesture recognition,
   e) sensor data evaluation,
   f) sensor data fusion,
   g) driving maneuver calculation,
   h) driver assistance functions in a vehicle,
   i) driving modes in accordance with one of the numerous possible degrees of automation when operating the vehicle,
   j) automated and/or autonomous driving.

5. The method according to claim 1, wherein the at least one edge computer comprises one of
   a) a stationary edge node for a network,
   b) a mobile edge node for a network
   c) a base station of a mobile service provider,
   d) a base station of a network provider
   e) a cellular telephone,
   f) a smartphone,
   g) a tablet,
   h) a vehicle, and
   i) a drone.

6. A control unit for a mobile end device for offloading computing from the mobile end device to at least one of an edge computer and/or a cloud computing device, comprising:
   a communication unit for (1) obtaining resource information from the edge computer, (2) obtaining resource information from the and/or cloud computing device, and (3) obtaining application information from at least one system application in the mobile end device; and
   a computer for (4) assigning a computing capacity for the at least one system application in the mobile end device to the at least one edge computer and/or the at least one cloud computer for offloaded computing,
   wherein the computer is configured to dynamically repeat (1)-(4), depending on a speed and/or route of the mobile terminal device.

7. The control unit according to claim 6, wherein the resource information from the at least one edge computer and/or the at least one cloud computer comprises at least one of:
   n) geographic position,
   o) connection quality,
   p) services offered,
   q) data transfer rate,
   r) computing power and/or memory,
   s) workload,
   t) reception range,
   u) temporal availability,
   v) available computing capacity,
   w) reliability,
   x) response times,
   y) power consumption, and
   z) costs.

8. The control unit according to claim 6, wherein the application information for the at least one system application in the mobile end device comprises at least one of:
   g) resource requirements,
   h) acceptable response time,
   i) file size,
   j) data type,
   k) power requirements, and
   l) costs.

9. The control unit according to claim 6, wherein the system application for offloaded computing comprises one of:
   k) navigation,
   l) streaming,
   m) data processing,
   n) gesture recognition,
   o) sensor data evaluation,
   p) sensor data fusion,
   q) driving maneuver calculation,
   r) driver assistance functions in a vehicle,
   s) driving modes in accordance with one of the numerous possible degrees of automation when operating the vehicle,
   t) automated and/or autonomous driving.

10. The control unit according to claim 6, wherein the at least one edge computer comprises one of
j) a stationary edge node for a network,
k) a mobile edge node for a network
l) a base station of a mobile service provider,
m) a base station of a network provider
n) a cellular telephone,
o) a smartphone,
p) a tablet,
q) a vehicle, and
r) a drone.

11. The control unit of claim 6, further comprising a memory for storing a dynamic list comprising at least one edge computer and/or at least one cloud computer within a reception range of the mobile end device.

12. The control unit of claim 11, wherein the computer is configured to dynamically update the dynamic list, based on at least one of the speed, route, and/or a desired system applications in the mobile end device.

13. A control unit for a mobile end device for offloading computing from the mobile end device to at least one of an edge computer and/or a cloud computing device, comprising:
a communication unit for (1) obtaining resource information from an edge computer, (2) obtaining resource information from the cloud computing device, and (3) obtaining application information from at least one system application in the mobile end device; and
a computer for (4) assigning a computing capacity for the at least one system application in the mobile end device to the at least one edge computer and/or the at least one cloud computer for offloaded computing, wherein the assigning is based on requirements for the system application and the resource information,
and wherein the computer is configured to dynamically repeat (1)-(4), depending on a speed and/or route of the terminal device.

14. The control unit according to claim 13, wherein the resource information from the at least one edge computer and/or the at least one cloud computer comprises at least one of:
a) geographic position,
b) connection quality,
c) services offered,
d) data transfer rate,
e) computing power and/or memory,
f) workload,
g) reception range,
h) temporal availability,
i) available computing capacity,
j) reliability,
k) response times,
l) power consumption, and
m) costs.

15. The control unit according to claim 13, wherein the application information for the at least one system application in the mobile end device comprises at least one of:
a) resource requirements,
b) acceptable response time,
c) file size,
d) data type,
e) power requirements, and
f) costs.

16. The control unit according to claim 13, wherein the system application for offloaded computing comprises one of:
a) navigation,
b) streaming,
c) data processing,
d) gesture recognition,
e) sensor data evaluation,
f) sensor data fusion,
g) driving maneuver calculation,
h) driver assistance functions in a vehicle,
i) driving modes in accordance with one of the numerous possible degrees of automation when operating the vehicle,
j) automated and/or autonomous driving.

17. The control unit according to claim 13, wherein the at least one edge computer comprises one of
a) a stationary edge node for a network,
b) a mobile edge node for a network
c) a base station of a mobile service provider,
d) a base station of a network provider
e) a cellular telephone,
f) a smartphone,
g) a tablet,
h) a vehicle, and
i) a drone.

* * * * *